United States Patent
Tamura et al.

(10) Patent No.: US 6,356,326 B1
(45) Date of Patent: Mar. 12, 2002

(54) ACTIVE MATRIX SUBSTRATE OF A LIQUID CRYSTAL DISPLAY COMPRISING AN INSULATING LAYER BEING MADE OF SOLID SOLUTION OF $SIO_X$ /$SIN_Y$

(75) Inventors: Tatsuhiko Tamura; Takashi Hirose, both of Kanazawa; Nobuyuki Tsuboi, Komatsu, all of (JP)

(73) Assignee: Matsushita Electric Industrial Co., Ltd. (JP)

(*) Notice: Subject to any disclaimer, the term of this patent is extended or adjusted under 35 U.S.C. 154(b) by 0 days.

(21) Appl. No.: 09/623,055

(22) PCT Filed: Feb. 23, 1999

(86) PCT No.: PCT/JP99/00807

§ 371 Date: Oct. 6, 2000

§ 102(e) Date: Oct. 6, 2000

(87) PCT Pub. No.: WO99/44094

PCT Pub. Date: Sep. 2, 1999

(30) Foreign Application Priority Data

Feb. 25, 1998 (JP) .............................. 10-43859

(51) Int. Cl.[7] .................. G02F 1/1333; G02F 1/136; H01L 29/04
(52) U.S. Cl. .................. 349/138; 349/42; 257/59
(58) Field of Search .................. 349/42, 43, 52, 349/138, 122; 257/59, 72, 649; 438/624

(56) References Cited

U.S. PATENT DOCUMENTS 4,521,079 A   6/1985  Leenhouts et al. .......... 349/137
5,869,901 A * 2/1999  Kusuyama .................. 257/263
5,892,563 A * 4/1999  Ono et al. .................. 349/143

FOREIGN PATENT DOCUMENTS

| JP | 61-230185 | 10/1986 |
| JP | 1-104051 | 7/1989 |
| JP | 4-303826 | 10/1992 |
| JP | 4-305627 | 10/1992 |
| JP | 5-11239 | 1/1993 |
| JP | 6-289379 | 10/1994 |
| JP | 9-45925 | 2/1997 |
| JP | 9-146118 | 6/1997 |
| JP | 9-146120 | 6/1997 |
| JP | 10-20342 | 1/1998 |
| JP | 10-41519 | 2/1998 |

\* cited by examiner

*Primary Examiner*—William L. Sikes
*Assistant Examiner*—Tarifur R. Chowdhury
(74) *Attorney, Agent, or Firm*—Parkhurst & Wendel, L.L.P.

(57) ABSTRACT

An active matrix substrate for liquid crystal display in which an active element and address wiring are disposed in a matrix on an insulating substrate. The active element and address wiring are covered with a transparent insulating layer, and then a transparent electrode for display is disposed on the transparent insulating layer. The transparent electrode for display is connected to the active element through a contact hole created on the transparent insulating layer. In this structure, a difference in refractive index between an element insulating layer which is a part of the active element under the transparent display electrode and the transparent insulating layer, and a difference in refractive index between the element insulating layer and insulating substrate are both set to within 0.2. This allows to obtain a liquid crystal display with satisfactory display quality.

4 Claims, 2 Drawing Sheets

ACTIVE MATRIX SUBSTRATE OF A LIQUID CRYSTAL DISPLAY COMPRISING AN INSULATING LAYER BEING MADE OF SOLID SOLUTION OF $SIO_X/SIN_Y$

FIELD OF THE INVENTION

The present invention relates to active matrix substrates (AM substrates), in which an active element is formed on every display pixel, used as substrates for liquid crystal displays (LCDs) and liquid crystal displays comprising the same.

BACKGROUND OF THE INVENTION

Liquid crystal displays (LCDs) are becoming larger in area with higher definition. Active elements formed on every display pixel control the potentials of transparent display electrodes in active matrix LCDs (AMLCDs), thus displaying the required images.

At present, AMLCDs generally comprise transparent display electrodes made of a solid solution of indium tin oxides (ITOs) and scanning line and signal line for sending signals to the transparent display electrodes formed in one plane. With increasing definition of AMLCD displays, the proportion of scanning line and signal line and active elements taking up the display screen has increased, resulting in reduction of the effective display area. Moreover, typical AMLCDs require a certain distance to be maintained between the scanning line and signal line and transparent display electrode to prevent short-circuiting. Accordingly, a higher definition results in reduced effective display area, thus decreasing the display luminance of AMLCDs.

One of the solutions to the above problem offers an AMLCD which disposes a transparent insulating layer on the scanning line and signal line and active elements after they are formed, and then a transparent display electrode on the transparent insulating layer (improved AMLCD). A conventional improved AMLCD is described next with reference to a drawing.

FIG. 1 is a sectional view of the improved AMLCD using an AM substrate. In FIG. 1, a thin film transistor (TFT) is used as an active element of the AM substrate. Also in FIG. 1, a gate electrode 2 which also acts as a scanning line, gate insulating layer 3, semiconductor layer 4, source electrode 5 which also acts as a source line, and drain electrode 6 are formed in this sequence on substrate 1 made of an insulating substrate such as glass. The gate insulating layer is generally made of silicon nitride (SiNx).

In the manufacturing of the AMLCD, the TFT, gate line, and source line corresponding to the number of pixels are first formed in a matrix on the substrate 1. Then, transparent insulating layer 7 is formed to cover these elements. Transparent display electrode 8 is then formed on the transparent insulating layer 7, and a contact hole is created on the transparent insulating layer 7 to directly connect the drain electrode 6 and transparent display electrode 8. In FIG. 1, opposing electrode 9, black matrix 10, color filter 11, and aligning layer 12 are formed on a glass substrate opposing the AM substrate, and liquid crystal 13 is filled between the AM substrate and opposing glass substrate.

As described above, the source electrode 5 and transparent display electrode 8 are formed on different planes in the improved AMLCD. In addition, the transparent insulating layer 7 is provided between the source electrode 5 and transparent display electrode 8 so that the source electrode 5 and transparent display electrode 8 do not short circuit even if they are close in a planar distance. Moreover, the source electrode 5 and transparent display electrode 8 may also be overlaid. This makes it possible to enlarge the area of the transparent display electrode 8, thus preventing reduction in display luminance while increasing the definition of the LCD. Furthermore, the covering of the source electrode 5 with the transparent display electrode 8 makes it possible to eliminate the influence of the electric field of the source electrode 5 on the liquid crystal display. These improvements have achieved significantly higher display performance of the improved AMLCD.

However, the conventional improved AMLCD uses materials with a significantly different refractive index for each layer as shown in Table 1. For example, the liquid crystal 13 is made of organic material, the transparent display electrode 8 is made of ITO layer, the transparent insulating layer 7 is made of resin, and the gate insulating layer 3 is made of $SiN_x$. The difference in refractive index generates interfacial reflections between layers, reducing light transmittance and resulting in a darker display.

TABLE 1

Materials and their refractive index in the conventional improved AMLCD.

| Layer name | Material | Refractive index | Difference in refractive index to an upper layer |
|---|---|---|---|
| Liquid crystal layer | Liquid crystal material | 1.55 | |
| Transparent display electrode | ITO | 1.9–2.0 | 35–0.45 |
| Transparent insulating layer | Acrylic resin | 1.5–1.6 | 0.3–0.5 |
| Gate insulating layer | $SiN_X$ | 1.8–2.0 | 0.2–0.5 |
| Glass substrate | Glass | About 1.5 | 0.3–0.5 |

The refractive index of the above ITO and $SiN_x$ layers may be modified slightly by adjusting the layer forming conditions. However, the refractive index of these materials is not changeable to the extent of achieving a refractive index similar to those of the liquid crystal material 13 which is organic material and the transparent insulating layer 7 which is resin material.

In addition, the transparent insulating layer 7 made of the above resin material generally has a thickness of about 2 to 3 μm for two purposes: to ensure a flat surface, and to prevent electrical interference between the transparent display electrode 8 and scanning line and signal line. However, the thickness of the transparent insulating layer 7 is generally manufactured with about ±10% variations. This variation in the thickness generates an optical path difference of the interfacial reflective light, creating interference fringes. The occurrence of such interference fringes has an extremely deleterious effect on the LCD display quality.

Since it is difficult, under the present manufacturing conditions, to reduce variations in the thickness of the transparent insulating layer, it is necessary to suppress the occurrence of interference fringes on the precondition that the present variations in the layer thickness occur, in order to improve the LCD display quality. The present invention sets the optical characteristics of the materials comprising each layer, in particular the refractive index, to a predetermined range as one way of suppressing the interference fringes generated in the above conventional AMLCD.

SUMMARY OF THE INVENTION

The present invention provides an active matrix substrate and a liquid crystal display comprising the same having the following characteristics:

a) a transparent insulating layer is formed on an insulating substrate where an active element and scanning line and signal line are disposed in a matrix, for covering the active element and address wiring;

b) a transparent display electrode is formed on the transparent insulating layer;

c) the transparent display electrode is connected to the active element via a contact hole created on the transparent insulating layer; and d) a difference in refractive index between an element insulating layer under the transparent display electrode which forms a part of the active element and the transparent insulating layer, and a difference in refractive index between the element insulating layer and insulating substrate are within 0.2.

DESCRIPTION OF THE PREFERRED EMBODIMENT

First Exemplary Embodiment

The first exemplary embodiment of the present invention is described with reference to FIG. 2.

The present invention specifies optical characteristics, particularly the refractive index, of layers comprising the display part on an AM substrate to within a predetermined range as a means of counteracting an above-described disadvantage of a conventional AMLCD.

Figure 1:
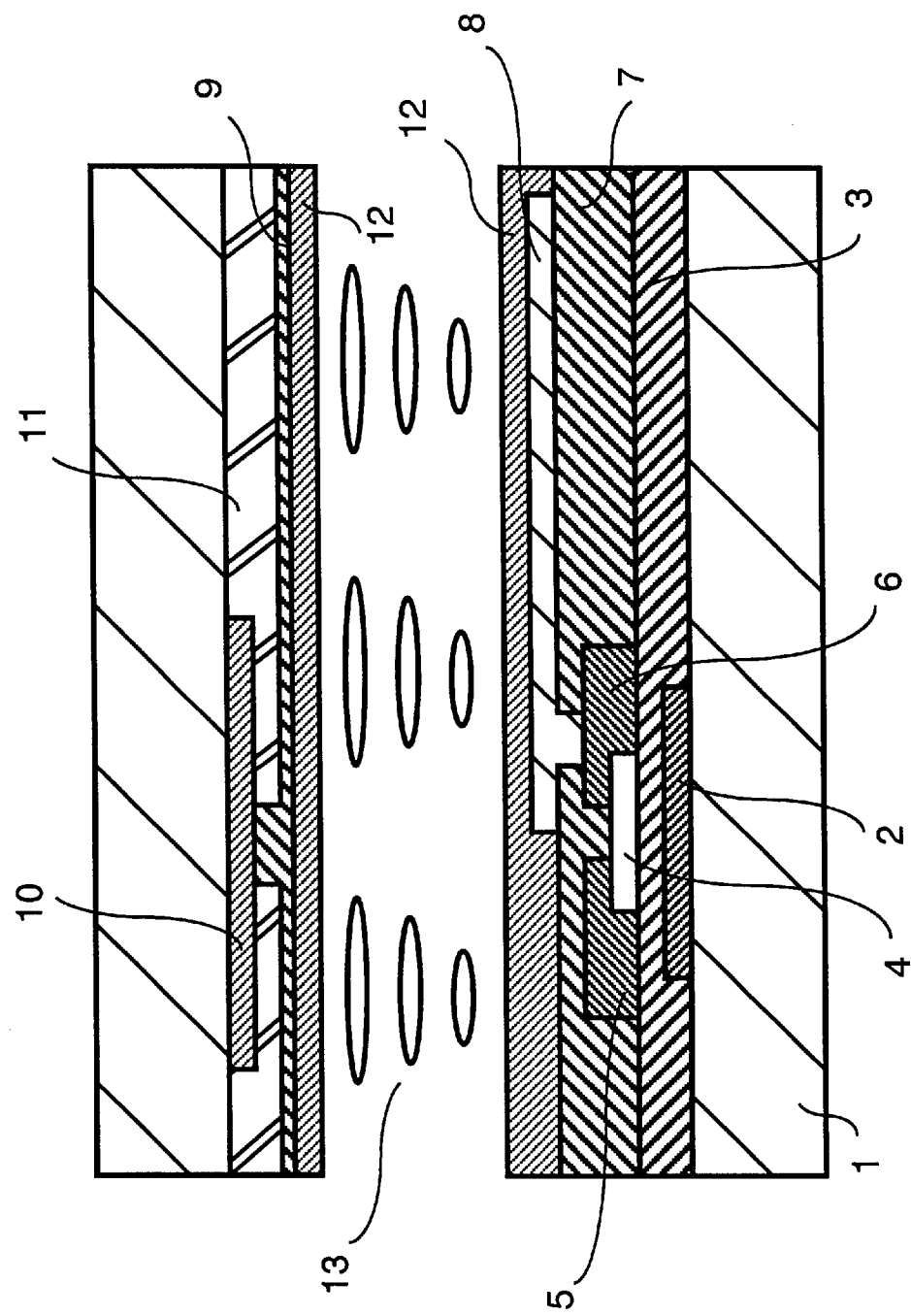
FIG. 1 is a sectional view of a conventional improved active matrix liquid crystal display.
Figure 2:
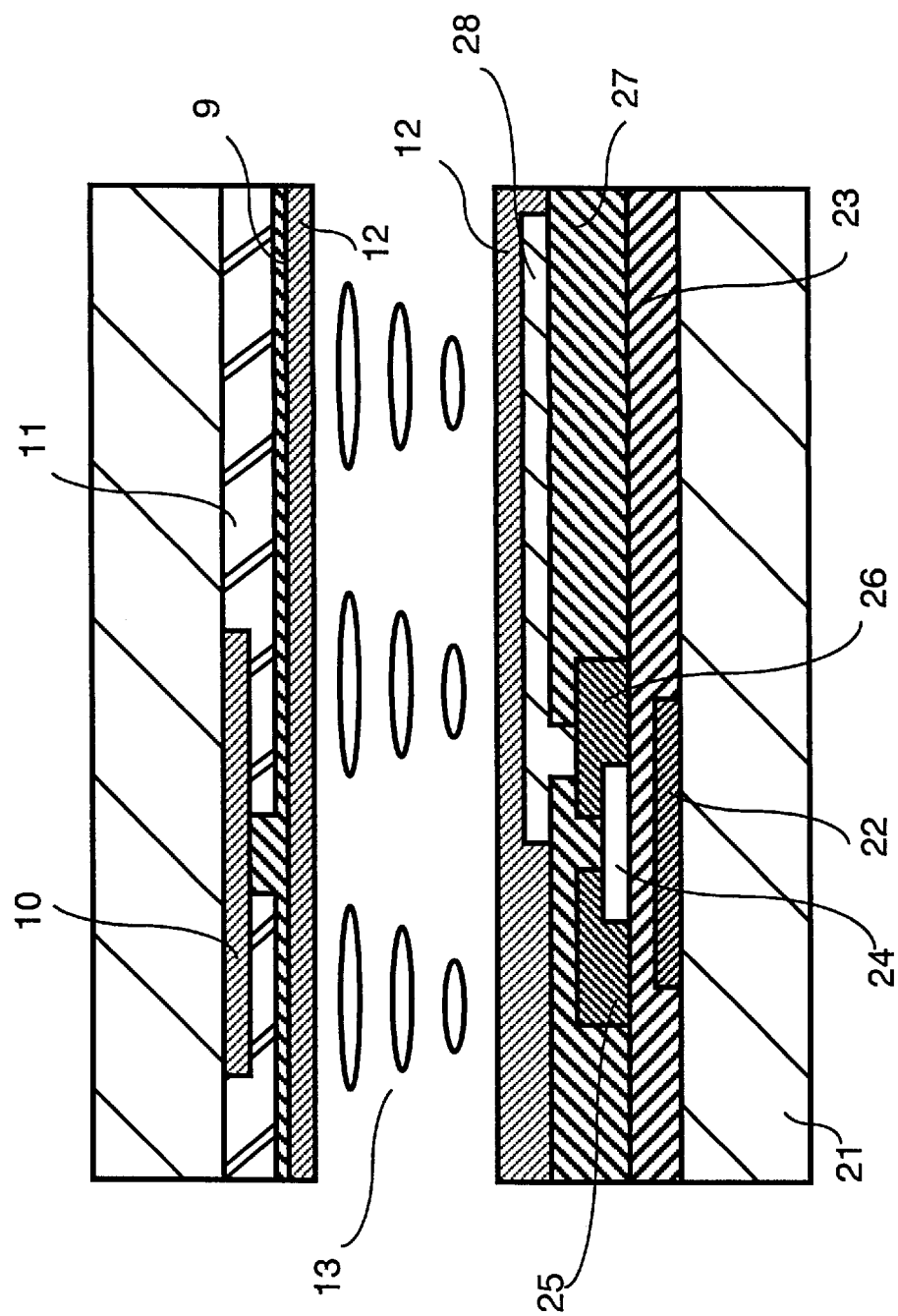
FIG. 2 is a sectional view of an improved active matrix liquid crystal display of the present invention.

More specifically, as shown in FIG. 2, the AM substrate of the present invention has transparent insulating layer 27 formed on the surface of insulating substrate 21 where active element 24 made of a semiconductor layer and address wiring (scanning line 22 and signal line 25) are disposed in a matrix. Transparent display electrode 28 for display is formed on the transparent insulating layer 27. Then, the active element 24 and transparent display electrode 28 are electrically connected via a contact hole created on the transparent insulating layer 27.

The sectional structure of the liquid crystal display of the present invention is basically equivalent to that of the conventional improved AMLCD. However, the AM substrate of the present invention limits both differences in refractive index between the transparent insulating layer 27 and gate insulating layer 23, and the gate insulating layer 23 and insulating substrate 21 within 0.2.

In other words, the results of experiments of the inventors reveal that degradation of LCD display quality is negligible even if the thickness of the transparent insulating layer 27 varies within the manufacturing conditions, provided both differences in refractive index between the above layers are within 0.2.

To achieve the above structure, the AM substrate in the exemplary embodiment of the present invention uses solid solution containing $SiO_X/SiN_Y$ (X: 0–2, Y: 0–4/3) as the material for the gate insulating layer, and a glass substrate as the insulating substrate.

The refractive indexes of materials used in a conventional AM substrate greatly differ as described in Table 1. Conversely, the AM substrate in the first exemplary embodiment has little difference in refractive index between the transparent insulating layer 27 and gate insulating layer 23, and the gate insulating layer 23 and insulating substrate 21, as shown in Table 2. Moreover, the difference in refractive index between the glass substrate 21 and gate insulating layer 23 and the gate insulating layer 23 and transparent insulating layer 27 may be minimized even if the refractive indexes of the glass substrate 21 and transparent insulating layer 27 change due to changes in the materials used for the glass substrate 21 and transparent insulating layer 27 dictated by manufacturing requirements, by adjusting the composition of the solid solution of $SiO_X/SiN_Y$ of the gate insulating layer 23.

TABLE 2

Materials and their refractive index in the first exemplary embodiment

| Layer name | Material | Refractive index | Difference in refractive index to an upper layer |
|---|---|---|---|
| Liquid crystal layer | Liquid crystal material | 1.55 | |
| Transparent display electrode | ITO | 1.9–2.0 | 0.35–0.45 |
| Transparent insulating layer | Acrylic resin | 1.5–1.6 | 0.3–0.5 |
| Gate insulating layer | $SiO_X/SiN_Y$ | 1.5–1.6 | 0.1 max. |
| Glass substrate | Glass | About 1.5 | 0.1 max. |

For manufacturing the gate insulating layer 23 made of solid solution of $SiO_X/SiN_Y$, a commonly used sputtering technique and a range of CVDs may be employed. In particular, CVD, which is conventionally used for manufacturing gate insulating layers, is suitable for manufacturing the gate insulating layer 23 of the present invention.

More specifically, the $SiO_X/SiN_Y$ solid solution can be manufactured by using mixed gas comprising nitrogen resource gas and oxygen instead of nitrogen resource gas such as ammonia used in the manufacture of the conventional gate insulating layer 3 by CVD. In other words, the $SiO_X/SiN_Y$ solid solution suitable for the gate insulating layer 23 of the present invention may be manufactured simply by adding oxygen to the supply gas, without requiring any other modifications to the existing manufacturing equipment.

The ratio of oxygen and nitrogen in the solid solution is set to predetermined values by controlling the mixing ratio of nitrogen resource gas and oxygen. Consequently, the gate insulating layer 23 with a predetermined refractive index is manufactureable without requiring any changes to be made to existing manufacturing equipment. Therefore, the refractive index of the gate insulating layer 23 may be easily adjusted to match the refractive index of the materials used to manufacture the glass substrate 21 and transparent insulating layer 27 even these materials are changed.

In addition to the use of CVD, the above gate insulating layer can also be manufactured using sputtering. In this case, the target may have the intended composition, or $Si_3N_4$ may be separately set as targets, with composition adjustable by changing the sputtering conditions such as gas partial pressure and applied voltage.

The exemplary embodiment describes the case of using $SiO_X/SiN_Y$ as a material for the gate insulating layer 23. It is apparent that any transparent material having a refractive index within a difference of 0.2 from that of both transparent insulating layer 27 and insulating substrate 21 may be used for the gate insulating layer 23.

The use of the AM substrate of the present invention in LCDs allows suppression of the generation of interface reflection at the interface of layers of the display part of the AM substrate in the LCD. This reduces the intensity of interference fringes generated by variations in the layer thickness of the transparent insulating layer, drastically limiting the damage these fringes cause to the display quality of the LCD. In addition, reduced interface reflection also improves transmittance of the AM substrate, making it possible to manufacture LCDs with good visibility and good display performance without changing the area of the display's transparent electrodes.

Industrial Applicability

As described above, the configuration of the present invention reduces the intensity of interference fringes generated by variations in the layer thickness of the transparent insulating layer in the manufacture, drastically limiting the damage these fringes cause to the display quality of the LCD. This configuration also achieves a significant effect of improving transmittance of the AM substrate, making it possible to manufacture LCDs with good visibility and good display performance without changing the area of the display's transparent electrodes.

Furthermore, if the $SiO_X/SiN_Y$ solid solution is used as a gate insulating layer for manufacturing the AM substrate of the present invention, the present invention also achieves a significant effect of manufacturing an LCD with good visibility and good display performance by just slightly changing the manufacturing conditions without requiring any other modification to the existing AM substrate manufacturing equipment.

What is claimed is:

1. An active matrix substrate comprising:

an insulating substrate;

an active element and address wiring disposed in a matrix on said insulating substrate;

a transparent insulating layer covering said active element and said address wiring; and a transparent display electrode formed on said transparent insulating layer, said transparent display electrode being connected to said active element through a contact hole created on said transparent insulating layer;

wherein said active matrix substrate has an element insulating layer which forms a part of said active element under said transparent insulating layer and said transparent display electrode, said element insulating layer is made of a solid solution of $SiO_X/SiN_Y$ (X: 0 to 2, Y: 0 to 4/3); and a difference in refractive index between said transparent insulating layer and said element insulating layer and a difference in refractive index between said element insulating layer and said insulating substrate are both within 0.2.

2. The active matrix substrate as defined in claim 1, wherein said element insulating layer is made of solid solution of one of $SiO_2$ and $SiO_X/SiN_Y$ (X: 0 to 2, Y: 0 to 4/3).

3. The active matrix substrate as defined in claim 1, wherein said solid solution of $SiO_X/SiN_Y$ is manufactured by one of CVD and sputtering.

4. A liquid crystal display employing an active matrix substrate, said active matrix substrate comprising:

an insulating substrate;

an active element and address wiring disposed in a matrix on said insulating substrate;

a transparent insulating layer covering said active element and said address wiring; and a transparent display electrode formed on said transparent insulating layer, said transparent display electrode being connected to said active element through a contact hole created on said transparent insulating layer;

wherein a difference in refractive index between said transparent insulating layer and an element insulating layer made of solid solution of $SiO_X/SiN_Y$ which forms a part of said active element under said transparent display electrode, and a difference in refractive index between said element insulating layer and insulating substrate are both within 0.2.

* * * * *